Jan. 17, 1967 L. W. MARSH, JR 3,298,114

KEY GENERATOR

Filed March 5, 1954

LYNN W. MARSH JR.
INVENTOR

ATTORNEY

United States Patent Office 3,298,11

Patented Jan. 17, 19( 3,298,114

KEY GENERATOR

Lynn W. Marsh, Jr., Marblehead, Mass. (300 Park Terrace Drive, Apt. 337, Melrose, Mass. 02176)

Filed Mar. 5, 1954, Ser. No. 414,521
3 Claims. (Cl. 35—4)

Figure 1:
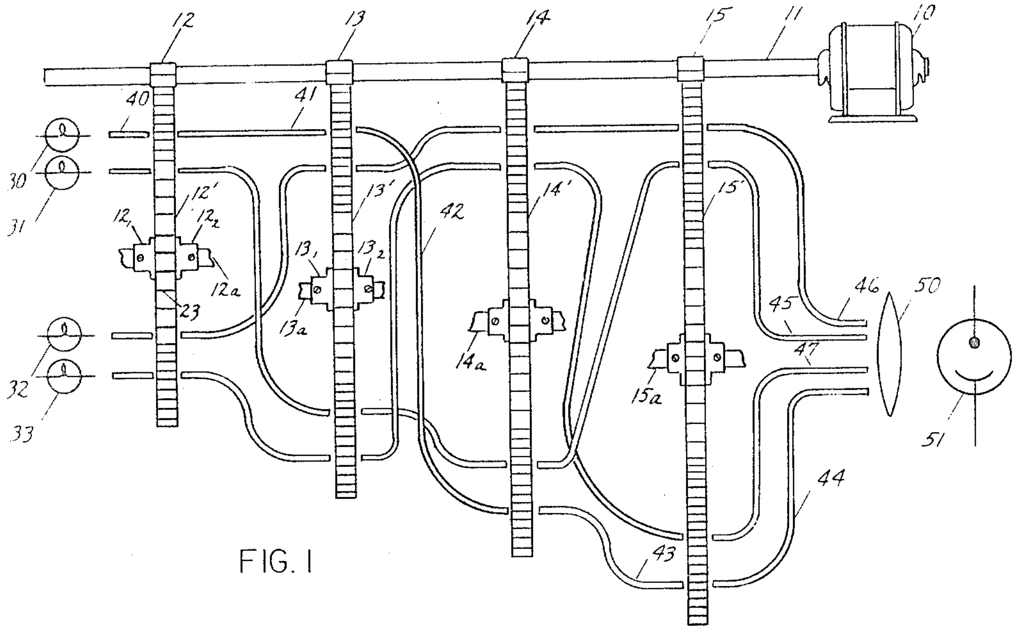

This invention is in cryptologic apparatus and particularly is a novel means for generating a keying sequence.

In many forms of communications, such as teletypewriter, the intelligence signal before transmission is reduced to a sequence of mark-space bauds, which bauds may be represented by on-off signals or by signals of any two convenient values.

Encipherment of a mark-space sequence is commonly accomplished according to the so-called Vernam rule, explained at length in the United States patent to Vernam, No. 1,310,719, which may briefly be said to mean that, whenever two marks occur simultaneously (one in an intelligence signal and the other in a keying signal), a mark is transmitted and, whenever two spaces occur, a mark likewise is transmitted, whereas when two dissimilar signals occur, a space signal is transmitted. The rule is capable, of course, of variation.

The foregoing is merely to illustrate that in present day cryptographic operations large amounts of key, comprising sequences of mark-space values, are necessary and further that security in such operations depends almost entirely upon the unpredictability of the order of the mark-space values of the keying sequences; the requirement of unpredictability is not met necessarily by randomicity, since a random order may include a long succession of mark signals "balanced out" by a preponderance of space signals later.

The principal object of this invention is to provide means for generating a very long unpredictable keying sequence.

Another object is to provide a fast light-operated key generator.

A further object is to provide a novel key generator utilizing a light source, a plurality of light paths, a light sensitive cell, and means for interrupting the paths between the source and the cell at virtually unpredictable intervals.

Other objects will be apparent from a reading of the following specification and claims.

Figure 2:
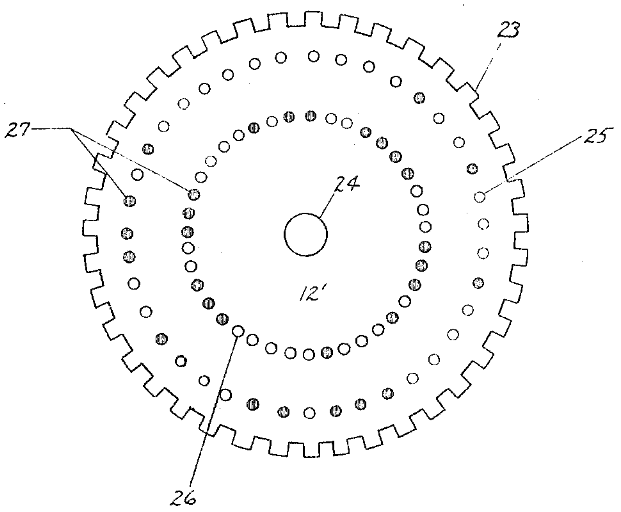

In the drawings:

FIGURE 1 is an illustration, somewhat diagrammatic, of the principal features of my invention; and FIGURE 2 is an elevation of a light-chopping disc utilized in the invention.

Referring to the drawings and particularly to FIGURE 1, 10 is a motor which drives a shaft 11 whereon are mounted pinions 12, 13, 14, and 15 which match with teeth on the peripheries of discs 12′, 13′, 14′, and 15′, respectively. As shown, the discs are regularly spaced but, as will hereinafter appear, this arrangement is not essential.

It will be observed that discs 12′, 13′, 14′, and 15′ are of different sizes. They are, however, in the preferred embodiment of the invention, rotated at the same peripheral speed, that is. at the same number of teeth per second. The arrangement illustrated, therefore, which includes a separate shaft (12*a*, 13*a*, 14*a*, and 15*a*, only a fragment of each being shown) for each wheel, is a simple solution to the problem although, obviously, by modification of driving means 11, 12, 13, 14, and 15 the same result can be achieved with a single straight shaft . It will be understood, of course, that in the construction shown the shafts 12*a*, 13*a*, 14*a*, and 15*a* do not rotate, but instead the wheels rotate upon the shafts, and some means, as collars $12_1$–$12_2$, $13_1$–$13_2$, etc., should, therefore, be provided prevent slipping of the discs lengthwise upon the shai As can be seen from the drawings and especially FI URE 2, wheel 12′ (which is representative of wheels 1 13′, 14′, and 15′) is relatively thin, with peripheral tee 23 for cooperation with the teeth of pinion 12, and opening 24 adapted to fit over shaft 12*a* of FIGURE The disc is made of any convenient opaque material. / ranged in a circular orbit about the center of the disc a at any desired distance therefrom is a series of openir 25, there being in the preferred form of the invention o opening for each tooth 23. A second row of openings radially aligned with openings 25 also is provided.

It will be noticed that certain of the openings, as : are plugged. Of course, it is not necessary that a f complement of openings be provided in the first pla but certain advantages of flexibility are achieved by for ing all the holes and providing plugs therefor. As w be explained more fully in the description to follow, t essential security, that is, the degree to which the outp of the apparatus is unpredictable, is dependent upon t manner of plugging of the openings in the discs, and t selection of openings to be plugged may, therefore, mathematically computed rather than random. Furth in order to lengthen the cycle of the apparatus, the whe will be provided with as large numbers of teeth and ope ings as practicable, and the numbers in the respecti wheels will preferably be prime each to the others.

Referring further to FIGURE 1, there may be se four lamps 30, 31, 32, and 33. They are normally light and supply input signals for the key generator. Exter ing from light source 30 to a point adjacent disc 12′ is rod 40 of Lucite or other material exhibiting a high degr of photoconductivity. The rod is aligned opposite o position in a row of openings in disc 12′; a similar rod extends from the same position in the same row of ope ings in disc 12 to some position in some row of openin in wheel 13′. Further Lucite sections 42, 43, and complete a light path through the system of discs. Sin lar paths are provided for each of the other light sourc 31, 32, and 33, these terminating respectively at 45, 4 and 47.

Just beyond the output ends 44, 45, 46, and 47 of t several Lucite paths are arranged a lens 50 and a phot cell 51. No means are shown for utilizing the output the photocell, but it may be amplified and used to co trol any of a number of circuits, the ultimate action which will be in the preferred embodiment of the inve tion to generate a sequence of on-off signals; an on sign for example, when cell 51 receives some light and an signal when cell 51 receives no light, the cell being sen tive only to conditions of light and no light.

While four light paths are shown, the number is n critical, and either more or fewer can be used, and, course, the discs can be provided with three or four ro of openings as easily as two. Still further, a single lig source can be used in place of light sources 30, 31, 32, a 33 just as a single photocell 51 is utilized for the output the apparatus.

With the parts assembled as in FIGURE 1 and discs 1 through 15′ rotating under the influence of motor 10 some speed determined by the desired characteristics the keying signal, the several lamps 30, 31, 32, 33 a their respective light paths will cooperate with the ope ings of the several discs 12′ through 15′ to provide t photocell 51 with intervals of light separated in virtual unpredictable order by intervals of no light.

The foregoing description is in specific terms, and ma modifications will suggest themselves. For the true sco of the invention, therefore, reference should be had to t subjoined claims wherein it may be noted the expressi mally interrupted" may be used for convenience to e the paths from the light source to the photocell ›ugh obviously such paths can be properly considered mally" complete.

:laim:

A key generator including a light source, a light sen- : device, a normally interrupted path for light from source to said device, a plurality of discs having open- therein, said openings completing said path when said ings are in predetermined disc-to-disc relation, and ıs for rotating said discs simultaneously.

A key generator including a light source, a light sen- : device, a plurality of normally interrupted paths ight from said source to said device, a plurality of having openings therein, said openings being adapted omplete a path when in predetermined disc-to-disc ion, and means for simultaneously rotating said thereby to change the disc-to-disc relations of said ings.

In a key generator, a disc of opaque material having nnular array of openings therethrough, another disc ›paque material having an annular array of a different number of openings therethrough, means for selectively obscuring said openings, means for rotating the discs simultaneously at different rates so that the openings progress at the same rate, a plurality of paths of photoconductive material between said discs each of said paths terminating adjacent but spaced from a disc and aligned with an opening therethrough, means for introducing light to said paths, and a photosensitive device positioned to be exposed to light emerging from said paths.

References Cited by the Examiner

UNITED STATES PATENTS

| | | | |
|---|---|---|---|
| 2,519,688 | 8/1950 | Mitchell ------------- | 179—18 |
| 2,558,577 | 6/1951 | Myers -------------- | 179—18 |
| 2,605,965 | 8/1952 | Shepherd ------------ | 179—18 |

EUGENE R. CAPOZIO, *Primary Examiner.*

FREDERICK M. STRADER, NORMAN H. EVANS, CHESTER L. JUSTUS, *Examiners.*

R. W. WEIG, *Assistant Examiner.*